US007589319B2

(12) United States Patent
Vestal

(10) Patent No.: US 7,589,319 B2

(45) Date of Patent: Sep. 15, 2009

(54) REFLECTOR TOF WITH HIGH RESOLUTION AND MASS ACCURACY FOR PEPTIDES AND SMALL MOLECULES

(75) Inventor: Marvin L. Vestal, Framingham, MA (US)

(73) Assignee: Virgin Instruments Corporation, Sudbury, MA (US)

( * ) Notice: Subject to any disclaimer, the term of this patent is extended or adjusted under 35 U.S.C. 154(b) by 360 days.

(21) Appl. No.: 11/742,703

(22) Filed: May 1, 2007

(65) Prior Publication Data

US 2008/0272290 A1 Nov. 6, 2008

(51) Int. Cl.
*B01D 59/44* (2006.01)
*H01J 49/00* (2006.01)

(52) U.S. Cl. ....................... 250/287; 250/281; 250/282; 250/286

(58) Field of Classification Search ................. 250/281, 250/282, 286, 287
See application file for complete search history.

(56) References Cited

U.S. PATENT DOCUMENTS 3,727,047 A * 4/1973 Janes ......................... 250/283
4,730,111 A 3/1988 Vestal et al.
4,731,533 A 3/1988 Vestal
4,766,312 A 8/1988 Fergusson et al.
4,814,612 A 3/1989 Vestal et al.
4,861,989 A 8/1989 Vestal et al.
4,883,958 A 11/1989 Vestal
4,902,891 A 2/1990 Vestal
4,958,529 A 9/1990 Vestal
4,960,992 A 10/1990 Vestal et al.
5,015,845 A 5/1991 Allen et al.
5,160,840 A * 11/1992 Vestal ........................ 250/287
5,498,545 A 3/1996 Vestal
5,625,184 A 4/1997 Vestal et al.
5,627,369 A 5/1997 Vestal et al.
5,654,545 A * 8/1997 Holle et al. ................. 250/287
5,760,393 A 6/1998 Vestal et al.
6,002,127 A 12/1999 Vestal et al.

(Continued)

FOREIGN PATENT DOCUMENTS

GB 2 370 114 6/2002

(Continued)

OTHER PUBLICATIONS

R. Kaufmann, et al., "Sequencing of Peptides in a Time-of-Flight Mass Spectrometer-Evaluation of Postsource Decay . . . ," Int. J. Mass Spectrom. Ion Process. 131: 355-385 (1994).

(Continued)

*Primary Examiner*—Nikita Wells
*Assistant Examiner*—Johnnie L Smith
(74) *Attorney, Agent, or Firm*—Kurt Rauschenbach; Rauschenbach Patent Law Group, LLC

(57) ABSTRACT

Many applications in the study of metabolics and proteomics require measurements on peptides and small molecules with high resolving power and mass accuracy. These are often present in complex mixtures and sensitivity over a relatively broad mass range, speed of analysis, reliability, and ease of use are very important. The present invention is a time-of-flight mass spectrometer providing optimum performance for these and similar applications.

19 Claims, 10 Drawing Sheets

U.S. PATENT DOCUMENTS

| | | | | |
|---|---|---|---|---|
| 6,057,543 | A | 5/2000 | Vestal et al. | |
| 6,175,112 | B1 | 1/2001 | Karger et al. | |
| 6,274,866 | B1 * | 8/2001 | Li | 250/287 |
| 6,281,493 | B1 | 8/2001 | Vestal et al. | |
| RE37,485 | E | 12/2001 | Vestal | |
| 6,326,615 | B1 * | 12/2001 | Syage et al. | 250/287 |
| 6,348,688 | B1 * | 2/2002 | Vestal | 250/287 |
| 6,414,306 | B1 | 7/2002 | Mayer-Posner et al. | |
| 6,441,369 | B1 | 8/2002 | Vestal et al. | |
| 6,504,150 | B1 | 1/2003 | Verentchikov et al. | |
| 6,512,225 | B2 | 1/2003 | Vestal et al. | |
| 6,534,764 | B1 * | 3/2003 | Verentchikov et al. | 250/287 |
| 6,541,765 | B1 | 4/2003 | Vestal | |
| 6,570,152 | B1 * | 5/2003 | Hoyes | 250/287 |
| 6,621,074 | B1 | 9/2003 | Vestal | |
| 6,670,609 | B2 | 12/2003 | Franzen et al. | |
| 6,674,070 | B2 | 1/2004 | Karger et al. | |
| 6,770,870 | B2 * | 8/2004 | Vestal | 250/281 |
| 6,825,463 | B2 | 11/2004 | Karger et al. | |
| 6,831,270 | B2 | 12/2004 | Furuta et al. | |
| 6,844,545 | B1 | 1/2005 | Hutchins et al. | |
| 6,900,061 | B2 | 5/2005 | Smirnov et al. | |
| 6,918,309 | B2 | 7/2005 | Brock et al. | |
| 6,933,497 | B2 | 8/2005 | Vestal | |
| 6,952,011 | B2 | 10/2005 | Brown et al. | |
| 6,953,928 | B2 | 10/2005 | Vestal et al. | |
| 6,995,363 | B2 | 2/2006 | Donegan et al. | |
| 7,030,373 | B2 | 4/2006 | Vestal et al. | |
| 7,064,319 | B2 | 6/2006 | Hashimoto et al. | |
| 7,109,480 | B2 | 9/2006 | Vestal et al. | |
| RE39,353 | E | 10/2006 | Vestal | |
| 7,176,454 | B2 | 2/2007 | Hayden et al. | |
| 2003/0057368 | A1 | 3/2003 | Franzen et al. | |
| 2003/0116707 | A1 | 6/2003 | Brown et al. | |
| 2005/0031496 | A1 | 2/2005 | Laurell et al. | |
| 2005/0087685 | A1 | 4/2005 | Bouvier et al. | |
| 2005/0116162 | A1 * | 6/2005 | Vestal | 250/287 |
| 2005/0130222 | A1 | 6/2005 | Lee et al. | |
| 2005/0178959 | A1 | 8/2005 | Lopez-Avila et al. | |
| 2005/0269505 | A1 * | 12/2005 | Ermer | 250/287 |
| 2006/0266941 | A1 | 11/2006 | Vestal | |
| 2006/0273252 | A1 | 12/2006 | Hayden et al. | |
| 2007/0038387 | A1 | 2/2007 | Chen et al. | |
| 2007/0054416 | A1 | 3/2007 | Regnier et al. | |
| 2007/0187585 | A1 * | 8/2007 | Verentchikov | 250/287 |
| 2008/0272287 | A1 * | 11/2008 | Vestal | 250/282 |
| 2008/0272289 | A1 * | 11/2008 | Vestal | 250/287 |
| 2008/0272293 | A1 * | 11/2008 | Vestal | 250/288 |

FOREIGN PATENT DOCUMENTS

| | | | |
|---|---|---|---|
| WO | WO 2004/018102 | A1 | 3/2004 |
| WO | WO 2005/061111 | A2 | 7/2005 |

OTHER PUBLICATIONS

J. Preisler, et al., “Capillary Array Electrophoresis-MALDI Mass Spectrometry using a Vacuum Deposition Interface,” Anal. Chem. 74: 17-25 (2002).

R. L. Caldwell and R. M. Caprioli, “Tissue Profiling by Mass Spectrometry,” MCP 4: 394-401 (2005).

M. L. Vestal, et al., “Delayed Extraction Matrix-Assisted Laser Desorption Time-of-Flight Mass Spectrometry,” Rapid Comm. Mass Spectrom. 9: 1044-1050 (1995).

M. L. Vestal and P. Juhasz, “Resolution and Mass Accuracy in Matrix-Assisted Laser Desorption Time-of-Flight Mass Spectrometry,” J. Am. Soc. Mass Spectrom. 9: 892-911 (1998).

E. J. Takach, et al., “Accurate Mass Measurement using MALDI-TOF with Delayed Extraction,” J. Prot. Chem. 16: 363-369 (1997).

D. J. Beussman, et al., “Tandem Reflectron Time-of-Flight Mass Spectrometer Utilizing Photodissociation,” Anal. Chem. 67: 3952-3957 (1995).

M. L. Vestal, “High-Performance Liquid Chromatography-Mass Spectrometry,” Science 226: 275-281 (1984).

* cited by examiner

REFLECTOR TOF WITH HIGH RESOLUTION AND MASS ACCURACY FOR PEPTIDES AND SMALL MOLECULES

BACKGROUND OF THE INVENTION

Matrix assisted laser desorption/ionization time-of-fight mass (MALDI-TOF) spectrometry is an established technique for analyzing a variety of nonvolatile molecules including proteins, peptides, oligonucleotides, lipids, glycans, and other molecules of biological importance. While this technology has been applied to many applications, widespread acceptance has been limited by many factors including cost and complexity of the instruments, relatively poor reliability, and insufficient performance in terms of speed, sensitivity, resolution, and mass accuracy.

In the art, different types of TOF analyzers are required depending on the properties of the molecules to be analyzed. For example, a simple linear analyzer is preferred for analyzing high mass ions such as intact proteins, oligonucleotides, and large glycans, while a reflecting analyzer is required to achieve sufficient resolving power and mass accuracy for analyzing peptides and small molecules. Determination of molecular structure by MS-MS techniques requires yet another analyzer. In some commercial instruments all of these types of analyzers are combined in a single instrument. This has the benefit of reducing the cost somewhat relative to three separate instruments, but the downside is a substantial increase in complexity, reduction in reliability, and compromises are required that make the performance of all of the analyzers less than optimal.

Many areas of science require accurate determination of the molecular masses and relative intensities of a variety of molecules in complex mixtures and while many types of mass spectrometers are known in the art, each has well-known advantages and disadvantages for particular types of measurements. Time-of-flight (TOF) with reflecting analyzers provides excellent resolving power, mass accuracy, and sensitivity at lower masses (up to 5-10 kda), but performance is poor at higher masses primarily because of substantial fragmentation of ions in flight. At higher masses, simple linear TOF analyzers provide satisfactory sensitivity, but resolving power is limited. An important advantage of TOF MS is that essentially all of the ions produced are detected, unlike scanning MS instruments.

Many applications in the study of metabolics and proteomics require measurements on peptides and small molecules with high resolving power and mass accuracy. These are often present in complex mixtures and sensitivity over a relatively broad mass range, speed of analysis, reliability, and ease of use are also very important. An objective of the invention is a mass spectrometer providing optimum performance for these and similar applications that is reliable, easy to use, and relatively inexpensive.

SUMMARY OF THE INVENTION

The mass spectrometer or analyzer of the present invention comprises a MALDI sample plate and pulsed ion source located in an evacuated source ion housing; an analyzer vacuum housing isolated from the evacuated source ion housing by a gate valve containing an aperture and maintained at ground potential; a vacuum generator that maintains high vacuum in the analyzer; a pulsed laser beam that enters the evacuated source housing through the aperture in the gate valve when the valve is open and strikes the surface of a sample plate within the source producing ions that enter the analyzer through the aperture; an ion detector in close proximity to the gate valve and the ion beam; a field-free drift space at ground potential; an ion mirror at the opposite end of the drift space from the gate valve and ion detector; and high voltage supplies for supplying electrical potential to the ion mirror.

In one embodiment, the analyzer further comprises an ion lens in close proximity to the ion source and aligned with the ion beam passing through the aperture in the gate valve.

In one embodiment, the analyzer further comprises ion deflectors (deflection electrodes) in close proximity to the ion lens for deflecting the ions to reach the detector. At least one of the deflection electrodes is energized by a time dependent voltage that causes ions in one or more selected mass ranges to be deflected away from the detector.

In one embodiment the transverse distance from the laser beam to the center line of the detector is not more than 25 mm.

In one embodiment the length of the field-free region, the lengths of each of the stages of the mirror, and the voltages applied to the mirror are chosen to provide both first and second order velocity focusing from the source focus to the detector.

The present invention provides a method for optimizing the ion source operating conditions to give the optimum resolving power possible for a given set of initial conditions, ion energy, and overall size of the analyzer.

A high voltage pulse generator supplies a voltage pulse to the MALDI sample plate at a predetermined time after the laser pulse. In one embodiment a digital delay generator determines the delay with an uncertainty and jitter of less than 1 nanaosecond between the laser pulse and the voltage pulse. The time between the voltage pulse and the time that ions are detected at the detector is recorded by the digitizer to produce a time-of-flight spectrum that may be interpreted as a mass spectrum by techniques well known in the art.

An object of the present invention is to provide the optimum practical performance within limitations imposed by the length of the analyzer, the accelerating voltage, and the initial conditions including the width of the initial velocity distribution of the ions produced by MALDI and the uncertainty in initial position due, for example, due to the size of the matrix crystals.

In TOF mass spectrometry the performance can generally be improved by increasing the length of the analyzer and, for higher masses, by increasing the accelerating voltage, but these tend to increase the cost and reduce the reliability. The initial conditions are determined by the ionization process and are independent of the TOF analyzer design. In one embodiment of the present invention the accelerating voltage is 10 kilovolts, and the effective length of the analyzer is 3200 mm.

In one embodiment deflection electrodes are provided in a field-free region adjacent to the extraction electrode and energized to deflect ions in either of two orthogonal directions. At least one of the deflection electrodes may be energized by a time dependent voltage that causes ions in one or more selected mass ranges to be deflected away from the detector.

In one embodiment, the present invention provides a reflecting time-of-flight mass spectrometer comprising an ion source vacuum housing configured to receive a MALDI sample plate; a pulsed ion source located within the ion source housing; an analyzer vacuum housing; a gate valve located between and operably connecting said ion source vacuum housing and said analyzer vacuum housing and maintained at or near ground potential; a field-free drift space at ground potential located within said analyzer vacuum housing; an ion mirror located at the end of the field-free space in said analyzer vacuum housing opposite said gate valve; and an ion detector located in the field-free space within the analyzer vacuum housing in close proximity to the gate valve and having an input surface to receive ions reflected by the ion mirror. The reflecting time-of-flight mass spectrometer of the present invention may further comprise a pulsed laser beam directed to strike the MALDI sample plate and produce a pulse of ions; a high voltage pulse generator operably connected to the pulsed ion source; and a time delay generator providing a predetermined time delay between the laser pulse and the high voltage pulse.

In one embodiment, the reflecting time-of-flight mass spectrometer of the present invention has a predetermined time delay comprising an uncertainty which is not more than 1 nanosecond.

In one embodiment, the reflecting time-of-flight mass spectrometer of the invention is configured to contain one or more ion optical elements for spatially focusing an ion beam. The optical elements consist of at least an extraction electrode at ground potential in close proximity to the MALDI sample plate and a first ion lens located between the pulsed ion source and the gate valve.

According to the present invention, the ion lenses may comprise either an einzel lens or a cathode lens.

In one embodiment the high voltage pulse is between 10-30 kilovolts relative to ground potential. In one embodiment, the high voltage pulse is at about 10 kilovolts relative to ground potential. As used herein, "about" includes values which are within 10% of the value stated. For example, "about 10 kilovolts" includes voltages of between 9 and 11 kilovolts.

In one embodiment the distance between the MALDI sample plate and a grounded extraction electrode is between 1-5 mm. In one embodiment, the distance between the MALDI sample plate and a grounded extraction electrode is between 1-3 mm. In one embodiment, the distance between the MALDI sample plate and a grounded extraction electrode is less than 3 mm.

In a preferred embodiment the high voltage pulse is 10 kilovolts relative to ground potential and the distance between the MALDI sample plate and a grounded extraction electrode is less than 3 mm.

In certain embodiments, the ion mirrors are two-stage ion mirrors. The two-stage ion mirrors of the present invention may comprise two substantially uniform fields, wherein the field boundaries are defined by grids that are substantially parallel or may comprise two substantially uniform fields, wherein the field boundaries are defined by substantially parallel conducting diaphragms having small apertures aligned with an incident and reflected ion beam.

In one embodiment, the electrical field strength in the first stage of the two-stage ion mirror adjacent to the field-free region is substantially greater than the electrical field strength in the second stage of the two-stage ion mirror.

In one embodiment, the electrical field strength in the first stage of the two-stage ion mirror adjacent to the field-free region is between two and four times greater than the electrical field strength in the second stage of the two-stage ion mirror.

According to the present invention, the reflecting time-of-flight mass spectrometer may further comprise one or more pairs of deflection electrodes located in the field-free region at ground with any pair energized to deflect ions in either of two orthogonal directions. In one embodiment, at least one of the deflection electrodes of any pair of deflection electrodes is energized by a time-dependent voltage resulting in the deflection of ions in one or more selected mass ranges.

In one embodiment, the transverse distance from the pulsed laser beam to the center line of the ion detector is between 5 and 20 mm. In one embodiment the transverse distance from the pulsed laser beam to the center line of the ion detector is between 10 and 15 mm.

In a preferred embodiment, the transverse distance from the pulsed laser beam to the center line of the ion detector is not more than 25 mm.

In one embodiment, the input surface of the ion detector is perpendicular to the axis of the ion mirror with a maximum error of +/−0.05 degrees.

The present invention provides a method for designing a high-resolution MALDI-TOF mass spectrometer with predetermined limits on overall size and uncertainty in the time measurement comprising determining or estimating the uncertainties in the initial velocity and position of the ions produced in the ion source; calculating values for the critical distance parameters defining the analyzer geometry; calculating the optimum time lag between laser pulse and high-voltage extraction pulse as a function of focus mass; calculating the optimum accelerating voltages and mirror voltages as functions of focus mass and calculating the theoretical resolving power as a function of m/z.

The present invention provides a method for designing a high-resolution MALDI-TOF mass spectrometer to achieve a specified resolving power at a specified mass with specified values of the uncertainties in the initial velocity and position of ions produced in the ion source and the uncertainty in the time measurement comprising calculating the minimum overall length and values for the critical distance parameters defining the analyzer geometry; calculating the optimum accelerating voltages and mirror voltages; and calculating the optimum time lag between laser pulse and high-voltage extraction pulse.

In one embodiment, the pulsed laser beam operates at a frequency of 5 khz.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
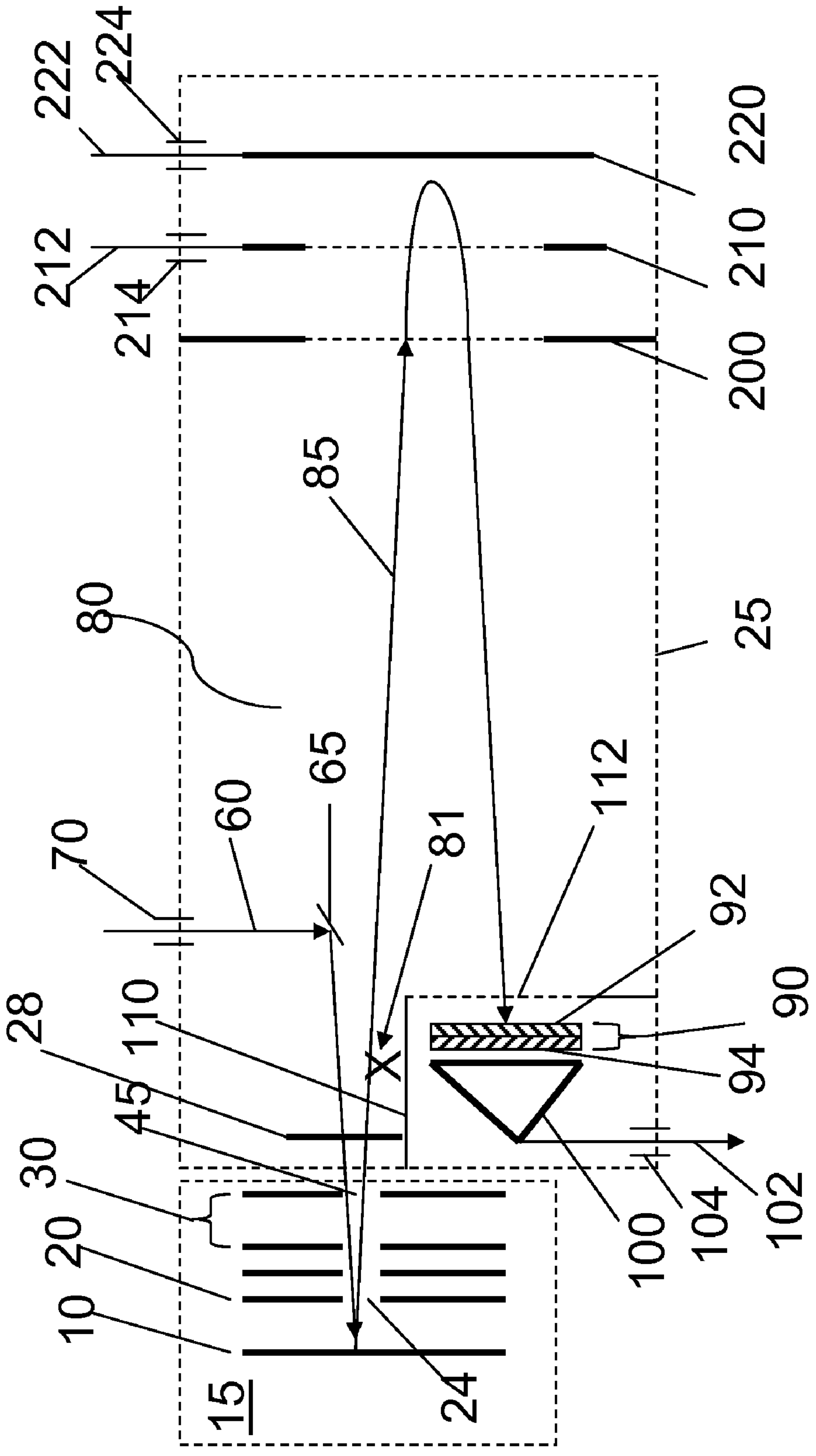
FIG. 1 is a schematic diagram of a reflecting time-of-flight analyzer according to the invention.

A description of preferred embodiments of the invention follows. Referring now to FIG. 1. A MALDI sample plate 10 with samples of interest in matrix crystals on the surface is installed within an evacuated ion source housing 15 and a sample of interest is placed in the path of pulsed laser beam 60. As used herein, a "MALDI sample plate" or "sample plate" refers to the structure onto which the samples are deposited. Such sample plates are disclosed and described in copending U.S. application Ser. No. 11/541,467 filed Sep. 29, 2006, the entire disclosure of which is incorporated herein by reference. At a select or predetermined time following the laser pulse which enters the analyzer vacuum housing via a window 70, the beam is and is deflected by mirror 65 and a high-voltage pulse 12 (shown in FIG. 2) is applied to the sample plate 10 producing an electric field between sample plate 10 and extraction electrode 20 at ground potential causing a pulse of ions to be accelerated. The ions pass through aperture 24 in the extraction electrode 20 and through first field-free region 30 and gate valve 45 in the open position, then through deflector 28 and into analyzer vacuum housing 25.

The ion beam 85 then passes through a field-free drift tube (or space) 80 and into an ion mirror 200 and are reflecting back through the field-free drift tube (or space) 80. The ion mirror comprises electrodes 214 and 224, each having an electrode feedthrough 212 and 222, respectively, through the analyzer vacuum housing. The mirror 200 also comprises a mirror grid 210 and a mirror electrode 220. The ions then pass through a grid 112 built into the detector and strike the input surface 92 of the detector 90 which is housed in housing 110. The detector comprises a dual channel plate electron multiplier. Each ion impinging on the input surface 92 produces a large number of electrons (ca. 1 million) in a narrow pulse at the output surface 94. The gain of the dual channel plate electron multiplier is determined by the bias voltage $V_d$ applied across the dual channel plate. The electrons are accelerated by the electric field between the output surface 94 and the anode 100 at ground potential, and strike the anode producing an electrical pulse 102 that is coupled through an electrical feedthrough 104 in the wall of the analyzer vacuum housing 25 and connected to the input of a digitizer (not shown).

In one embodiment, the ion mirror dimensions and operating voltages are chosen so that the time required for ions to travel from a predetermined focal point 81 in the field-free drift tube (or space) 80, be reflected by the ion mirror, and reach the detector 90 is independent of the energy of the ions to both first and second order. First and second order focusing in a reflector requires satisfying the following equations:

$$4d_3/D_m=1-3/w \tag{1}$$

$$4d_4/D_m=w^{-3/2}+(4d_3/D_m)/(w+w^{1/2}) \tag{2}$$

where $D_m$ is the total length of the ion path from the focal point 81 to the mirror entrance plus the path from the mirror exit to the detector input surface 92, $d_3$ is the length of a first region of the mirror, $d_4$ is the distance that an ion with initial energy V penetrates into a second region of the mirror and $w=V/(V-V_1)$ is the ratio of the ion energy at the entrance to the mirror to that at the entrance to the second region with the intermediate electrode at potential $V_1$.

Thus, first and second order focusing can be achieved for any value of w>3, and the corresponding distance ratios are uniquely determined by equations (1) and (2). For predetermined values of $d_3$ and $D_m$, voltage $V_1$ applied to mirror grid 210 is adjusted to satisfy equation (1) and voltage $V_2$ applied to mirror electrode 220 is adjusted to satisfy equation (2), where $$d_4=d_4^0(V-V_1)/(V_2-V_1) \tag{3}$$

In a preferred embodiment w=3.66, $V_1/V=0.7268$, $d_3=d_4^0=100$ mm, $V_2/V=1.008$, and $d_4=97.2$ mm and the focal length $D_m=2218.5$ mm for first and second order focusing.

The effective length of the ion mirror is given by $$D_{em}=4d_4w^{1/2}+4d_3[w/(w-1)][1-w^{-1/2}]=1020.6\text{ mm} \tag{4}$$

The first order mass dependent focal length of a single-stage ion source is given by $$D_1=2d_1+(2d_1)^2/v_n\Delta t \tag{5}$$

And the second order focal length is given by $$D_2=6d_1 \tag{6}$$

And these are satisfied simultaneously if $$v_n\Delta t=d_1 \tag{7}$$

If the energy is 10 kV and the focus mass is 3 kDa, this requires that Δt=118 nsec. The total effective flight distance is then $$D_e=2218.5+1020.6+18+4=3263.1 \tag{8}$$

and the effective length of the lens is included in $D_m$.

The effective length, $D_e$, of a time-of-flight analyzer may be defined as the length of a field-free region for which the flight time of an ion with kinetic energy corresponding to that in the field free drift tube (or space) 80 is equal to that of the same ion in the analyzer including accelerating and decelerating fields.

In one embodiment, the effective length, $D_e$, is approximately 3263.1 mm and ion energy is 10 kV, corresponding to a high-voltage pulse 12 of 10 kV in amplitude applied to MALDI sample plate 10. In this embodiment the flight time is approximately $$t=(3263.1/0.0139)(m/10)^{1/2}=74{,}240\text{ m}^{1/2} \tag{9}$$

where t is in nsec and m in kDa. For a repetition rate of 5 khz the maximum flight time is 200,000 nsec thus the maximum mass is 7.2 kDa starting from mass zero.

The low mass region is dominated by ions from the MALDI matrix that are generally not useful for the analysis of samples. Also, if ions of masses higher than 7.2 kDa are produced, these will arrive following the next laser pulse and will be recorded at an incorrect mass. Therefore, in one embodiment an ion gate is provided that limits the mass range of ions exiting the ion source following each laser pulse so that only ions within a predetermined mass range are transmitted and detected.

Figure 2:
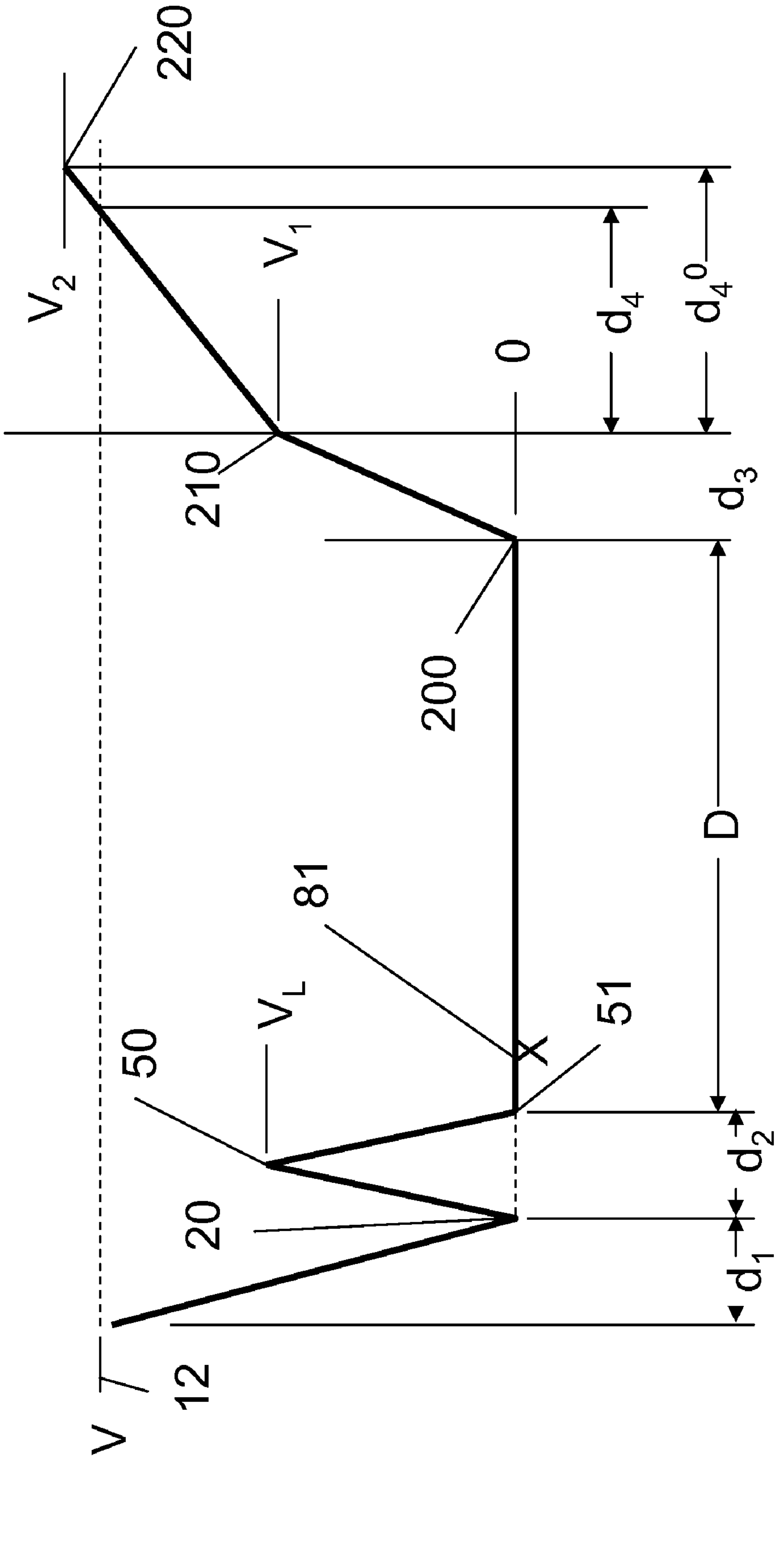
FIG. 2 is a representation of a potential diagram for one embodiment of the invention.

FIG. 2 represents a potential diagram for one embodiment of the invention. The distances noted on the figure include $d_1$, the length of the first accelerating region between the MALDI sample plate 10 and the extraction electrode 20; $d_2$, the length of the focusing lens; D, the length of the field-free drift tube (or space) 80; and $d_3$ and $d_4$, the lengths of the first and second stages, respectively, of the ion mirror. The overall length of the analyzer is the sum of these distances plus any additional required for the ion source and analyzer vacuum housings.

In one embodiment, the length D of the field free drift tube (or space) 80 is large compared to the sum of the other distances, and $d_1$ to is small as practical without initiating electrical discharge within the vacuum system.

Figure 3:
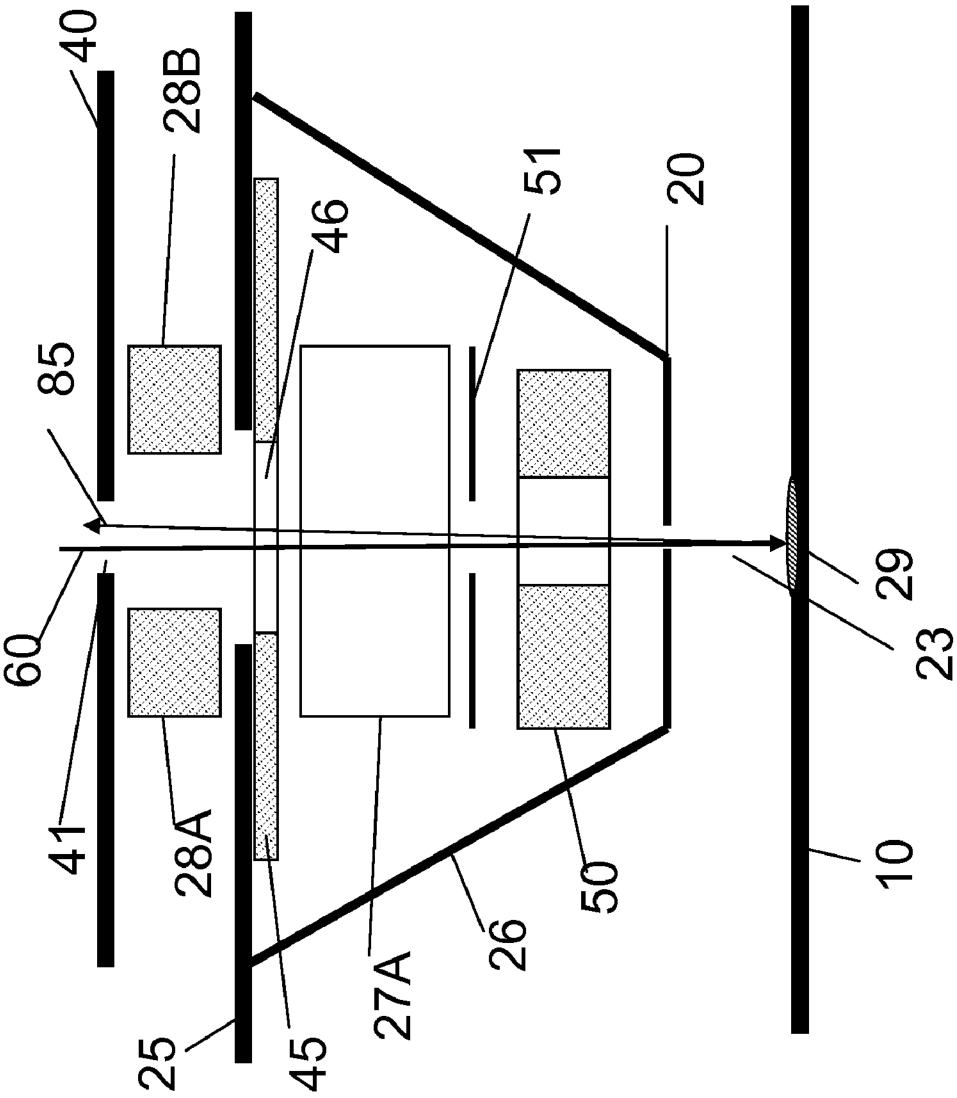
FIG. 3 is an expanded schematic of the first field-free region of an embodiment of the invention comprising an ion lens in this region.

FIG. 3 shows a partial cross-sectional detail of a two-stage acceleration. The figure further illustrates the accelerating region between the MALDI sample plate 10 and the grounded extraction electrode 20, the first field-free region 30 between the extraction electrode 20 and the analyzer vacuum housing 25, and the first portion of the second field-free region 80 between the analyzer source housing 25 and grounded electrode 40. In some embodiments the first field-free region is enclosed in a grounded shroud 26. Included within the first field-free region are gate valve 45 (having aperture 46), and deflection electrodes 27 and 28. In the cross-sectional view 27A is below the plane of the drawing and 27B is above the plane of the drawing (not shown). Deflection electrodes 28A and 28B are located in the field-free region between the analyzer vacuum housing 25 and acceleration electrode 40, having aperture 41.

Voltage may be applied to one or more of the electrodes, 27A, 27B, 28A, and 28B to deflect ions in the ion beam 85 produced by the pulsed laser beam 60 striking sample 29 deposited on the surface of the MALDI plate 10. A voltage difference between 27A and 27B deflects the ions in a direction perpendicular to the plane of the drawing, and a voltage difference between 28A and 28B deflects ions in the plane of the drawing.

Voltages can be applied as necessary to correct for misalignments in the ion optics and to direct ions along a preferred path to the detector. Also, a time dependent voltage can be applied to one or more of the deflection electrodes to deflect ions within predetermined mass ranges so that they cannot reach the detector and to allow ions in other predetermined mass ranges to pass through undeflected.

Electrodes 50 and 51 together with the extraction electrode 20 comprise an einzel lens that may be energized by applying voltage $V_L$ to electrode 50.

The effective length of the lens is given by $$D_{eL}=2d_2Z[1-(1-Z^{-1})^{1/2}] \text{ where } Z=V/V_L \quad (10)$$

In one embodiment Z=2, and the $D_{eL}$ is approximately equal to 1.17 $d_2$. The effective length of the lens is included in the field-free space between the exit from the source and the ion mirror.

Figure 4:
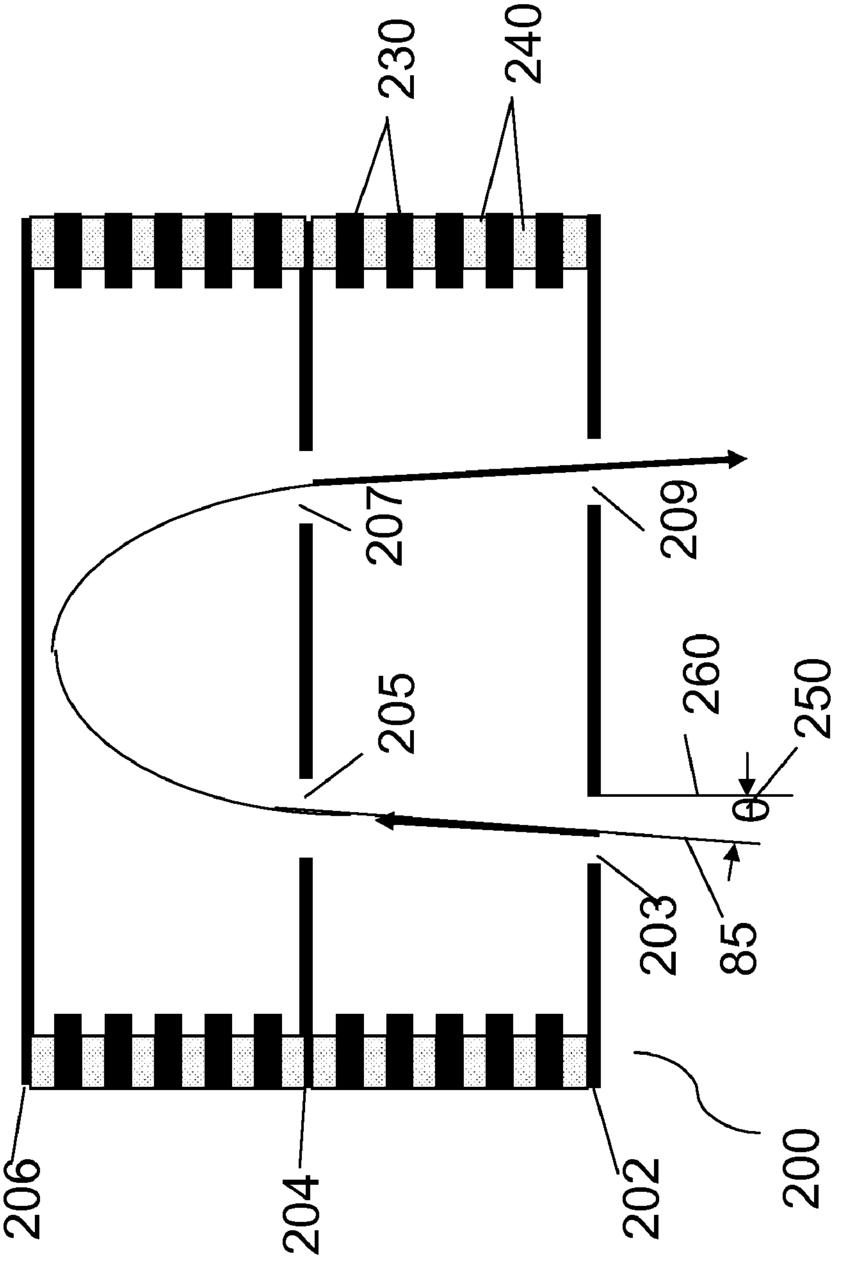
FIG. 4 is a representation of a two-stage gridless ion mirror according to one embodiment of the invention.

In one embodiment, ion mirror 200 comprises a two-stage gridless mirror shown schematically in FIG. 4. Electrode 202 is at ground potential. Electrode 204 is connected to first mirror potential $V_1$ and electrode 206 is connected to second mirror potential $V_2$. Apertures 203, 205, 207, and 209 in electrodes 202 and 204 are aligned with the nominal path of the ion beam through the mirror.

In operation an ion beam enters the reflector through aperture 203 in first mirror plate 202 at a small angle θ 250 relative to a perpendicular 260 to plate 202. Potentials are applied to plates 204 and 206 causing the ions to pass through aperture 205 in plate 204 and be reflected back through aperture 207 in plate 204 and 209 in plate 202 and exits reflector 200 along a trajectory at an angle 251 relative to perpendicular 260 that is equal in degree but opposite in direction to angle 250. A set of substantially identical electrodes 230 and insulators 240 are stacked as illustrated in FIG. 4 to make electrodes 202, 204, and 206 substantially parallel. Resistive dividers (not shown) are connected between plates 202 and 204 and between 204 and 206 to provide substantially uniform electrical fields between plates 202 and 204 and between 204 and 206.

Aperture diameters are chosen sufficiently large to allow a substantial fraction of the unfragmented ions to pass through the mirror. It is within the skill in the art to select an appropriate aperture size for the application. Ions that have lost significant energy due to fragmentation in flight follow a different path and are prevented from passing through the exit aperture 209.

The arrangement employed to insure that the fields are substantially uniform in the region that the ion beam passes through is illustrated in FIG. 4. A stack of electrodes comprised of essentially identical electrodes 230, is formed with substantially identical insulating rings 240 interspersed between the electrodes. A resistive voltage divider consisting of a set of substantially identical resistors is connected between electrode 204 biased at potential $V_1$ and electrode 202 based at ground potential. The number of resistors in the divider is equal to the number of insulating rings located between electrodes 202 and 204, and each of the electrodes 230 in the stack is connected to the corresponding junction in the resistive voltage divider. A similar resistive voltage divider between electrode 206 at potential $V_2$ and electrode 204 biased at potential $V_1$ is connected to electrodes 230 located between electrodes 204 and 206.

The time required for an ion to travel from the ion source to a deflection electrode (i.e., deflector) following application of the high-voltage accelerating pulse to the MALDI plate 10 is essentially proportional to the square root of the mass-to-charge ratio, and this time can be calculated with sufficient accuracy from a knowledge of the applied voltage V and the distances involved. To transmit ions within a specified mass range, for example from $m_1$ to $m_2$, voltage is applied to the deflector at or before the laser pulse occurs and continues until the time that $m_1$ arrives at the entrance to the deflector, and is turned off until the time that $m_2$ exits the deflector. After $m_2$ exits the deflector, the voltage is turned back on. For example, mass ranges such as 0.5-11.5 kDa or 0.1-9 kDa can be acquired at 5 khz by using the mass gate to select a portion of the spectrum corresponding to arrival times at the detector within a 200 microsecond window corresponding to the time between laser pulses. Any ions outside the selected range are removed by the mass gate and the possibility of high masses overlapping into the spectrum produced by the next laser pulse is removed. The mass gate can also be employed to limit the mass range to a narrower window when required by the application.

The limit on resolving power set by time resolution is given by $$R_t^{-1}=t/2\delta t \quad (11)$$

Where δt is the uncertainty of the time measurement.

Design of TOF Analyzers

The principal measures of performance are sensitivity, mass accuracy, and resolving power. Sensitivity is the most difficult of these since it generally depends on a number of factors some of which are independent of the attributes of the analyzer. These include chemical noise associated with the matrix or impurities in the sample, and details of the sample preparation. For the purpose of assessing the performance of the analyzer independent of these extraneous (although often dominant) factors the major components of sensitivity are the efficiency with which sample molecules are converted to ions providing measurable peaks in the mass spectrum, and the ion noise associated with ions detected that provide no useful information. The efficiency may be further divided into ionization efficiency (ions produced/molecule desorbed), transmission efficiency, and detection efficiency. A very important term that is often ignored is the sampling efficiency (sample molecules desorbed/molecule loaded).

The major sources of ion loss and ion noise are fragmentation and scattering. Fragmentation can occur spontaneously at any point along the ion path as a result of excitation received in the ionization process. Fragmentation and scattering can also occur as the result of collisions of the ions with neutral molecules in the flight path or with electrodes and grids. A vacuum in the low $10^{-7}$ torr range is sufficient to effectively limit collisions with neutral molecules, but grids and defining apertures required to achieve resolving power in some cases may reduce sensitivity both due to ion loss and production of ion noise.

In a linear TOF, fragmentation in the field-free region may produce some tails on the peaks, but generally has at most a small effect on sensitivity. The major loss and source of ion noise is fragmentation in the ion accelerator. If acceleration occurs between the end of the drift space and the detector, ghost peaks may occur as the result of low mass charged fragments arriving early and neutral fragments arriving late. No defining apertures or grids are required in the linear analyzer.

In reflecting analyzers ions that fragment between the source and mirror will appear as broad peaks at an apparent mass below the peak for the precursor mass, since the fragments spend less time in the ion mirror. Ions fragmenting in the mirror are randomly distributed in the space between the parent ion and the fragment. Grids are often used in the mirror to improve resolving power; these may cause a significant loss in ion transmission and a source of ion noise.

In MALDI-TOF the most obvious limitation on resolving power and mass accuracy is set by the initial velocity distribution that is at least approximately independent of the mass and charge of the ions. Time lag focusing can be employed to reduce the effect of initial velocity, and the distribution in initial position of the ions may become the limiting factor. Other limits are imposed by trajectory errors and the uncertainty in the measurement of ion flight times.

Reflecting Analyzer

Referring again to FIG. 2, in one embodiment $d_1$=3 mm, $d_2$=6 mm, $d_3$=100 mm, $d_4$ =97.2 mm, $D_m$=2218.5, $D_{em}$=1020.6. In this case the total effective length is $$D_e=D_m+D_{em}+6d_1+2d_1=2218.5+1020.6+18+4=3263.1$$

and the effective length of the lens is included in $D_m$.

The various contributions to peak width in TOF MS can be summarized as follows: (expressed as Δm/m)

First order dependence on initial position $$R_{s1}=[(D_v-D_s)/D_e](\delta x/d_1) \quad (12)$$

Where $D_e$ is the effective length of the analyzer, δx is the uncertainty in the initial position, $d_1$ is the length of the first region of the ion accelerator, and $D_v$ and $D_s$ are the focal lengths for velocity and space focusing, respectively, and are given by $$D_s=2d_1 \quad (13)$$

$$D_v=D_s+(2d_1)^2/(v_n{}^*\Delta t)=6d_1 \quad (14)$$

Where Δt is the time lag between ion production and application of the accelerating field, and $v_n{}^*$ is the nominal final velocity of the ion of mass m* focused at $D_v$. $v_n{}^*$ is given by $$v_n{}^*=C_1(V/m^*)^{1/2} \quad (15)$$

The numerical constant $C_1$ is given by $$C_1=(2z_0/m_0)^{1/2}=2\times1.60219\times10^{-19}\text{ coul}/1.66056\times10^{27}\text{ kg}=1.38914\times10^4 \quad (16)$$

For V in volts and m in Da (or m/z) the velocity of an ion is given by $$v=C_1(V/m)^{1/2}\text{ m/sec} \quad (17)$$

and all lengths are expressed in meters and times in seconds. It is numerically more convenient in many cases to express distances in mm and times in nanoseconds. In these cases $C_1=1.38914\times10^{-2}$.

The time of flight is measured relative to the time that the extraction pulse is applied to the source electrode. The extraction delay Δt is the time between application of the laser pulse to the source and the extraction pulse. The measured flight time is relatively insensitive to the magnitude of the extraction delay, but jitter between the laser pulse and the extraction pulse causes a corresponding error in the velocity focus. In cases where Δt is small, this can be a significant contribution to the peak width. This contribution due to jitter δj is given by $$R_\Delta=2(\delta_j/\Delta t)(\delta v_0/v_n{}^*)(D_v-D_s)/D_e=2(\delta_j\delta v_0/D_e)[(D_v-D_s)/2d_0 y]^2 \quad (18)$$

and is independent of mass.

With time lag focusing the first order dependence on initial velocity is given by $$R_{v1}=[(4d_1 y)/D_e](\delta v_0/v_n)[1-(m/m^*)^{1/2}]=R_{v1}(0)[1-(m/m^*)^{1/2}] \quad (19)$$

Where $\delta v_0$ is the width of the velocity distribution. At the focus mass, m=m*, the first order term vanishes.

With first order focusing the velocity dependence becomes $$R_{v2}=2[(2d_1 y)/(D_v-D_s)]^2(\delta v_0/v_n)^2 \quad (20)$$

And with first and second order velocity focusing the velocity dependence becomes $$R_{v3}=4[(2d_1 y)/(D_v-D_s)]^3(\delta v_0/v_n)^3 \quad (21)$$

The dependence on the uncertainty in the time measurement $\delta t$ is given by $$R_t=2\delta t/t=(2\delta t C_1/D_e)(V/m)^{1/2} \quad (22)$$

The dependence on trajectory error $\delta L$ is given by $$R_L=2\delta L/D_e \quad (23)$$

A major contribution to $\delta L$ is often the entrance into the channel plates of the detector. If the channels have diameter d and angle a relative to the beam, the mean value of $\delta L$ is d/2 sin $\alpha$. Thus this contribution is $$R_L=d/(D_e \sin\alpha) \quad (24)$$

Noise and ripple on the high voltage supplies can also contribute to peak width. This term is given by $$R_V=\Delta V/V \quad (25)$$

where $\Delta V$ is the variation in V in the frequency range that effects the ion flight time.

It is obvious from these equations that increasing the effective length of the analyzer increases the resolving power, but some of the other effects are less obvious. The total contribution to peak width due to velocity spread is given by $$R_v=R_m+(\Delta D_{12}/D_e)R_{v2}+[(D_e-\Delta D_{12})/D_e]R_{v3} \quad (26)$$

where $\Delta D_{12}$ is the absolute value of the difference between $D_{v1}$ and $D_{v2}$. Assuming that each of the other contributions to peak width is independent, the overall resolving power is given by $$R^{-1}=[R_\Delta{}^2+R_{s1}{}^2+R_v{}^2+R_t{}^2+R_L{}^2+R_V{}^2]^{-1/2} \quad (27)$$

Optimization of the Reflecting Analyzer

For a reflecting analyzer with first and second order focusing the terms limiting the maximum resolving power are $R_{s1}$, $R_{v3}$, and $R_t$. The variation of resolving power with mass is determined primarily by $R_{v1}$ and may also be affected by $R_t$. In terms of the dimensionless parameter $K=2d_1/(D_v-D_s)$ the major contributions can be expressed as $$R_{s1}=2K^{-1}[\delta x/D_e] \quad (28)$$

$$R_{v3}=4K^3(\delta v_0/v_n)^3 \quad (29)$$

$$\text{And } R^2=4K^{-2}[\delta x/D_e]^2+16K^6(\delta v_0/v_n)^6 \quad (30)$$

The minimum value of $R^2$ corresponds to $d(R^2)dK=0$ $$-8K^{-3}[\delta x/D_e]^2+96K^5(\delta v_0/v_n)^6=0$$

$$K^8=(1/12)[\delta x/D_e]^2(\delta v_0/v_n)^{-6}$$

$$K=0.733\{[\delta x/D_e]/(\delta v_0/v_n)^3\}^{1/4} \quad (31)$$

For one embodiment $[\delta x/D_e]=0.01/3263.1=3\times10^{-6}$, $(\delta v_0/v_n)^3=(0.0004/0.0254)^3=3.9\times10^{-6}$ K=0.69. For the embodiment described above K=0.5; very close to the optimum. In the more general case $$K=12^{-1/8}(De)^{-1/4}\{[\delta x C_1{}^3(\delta v_0)^{-3}\}^{1/4}(V/m^*)^{3/8} \quad (32)$$

Figure 5:
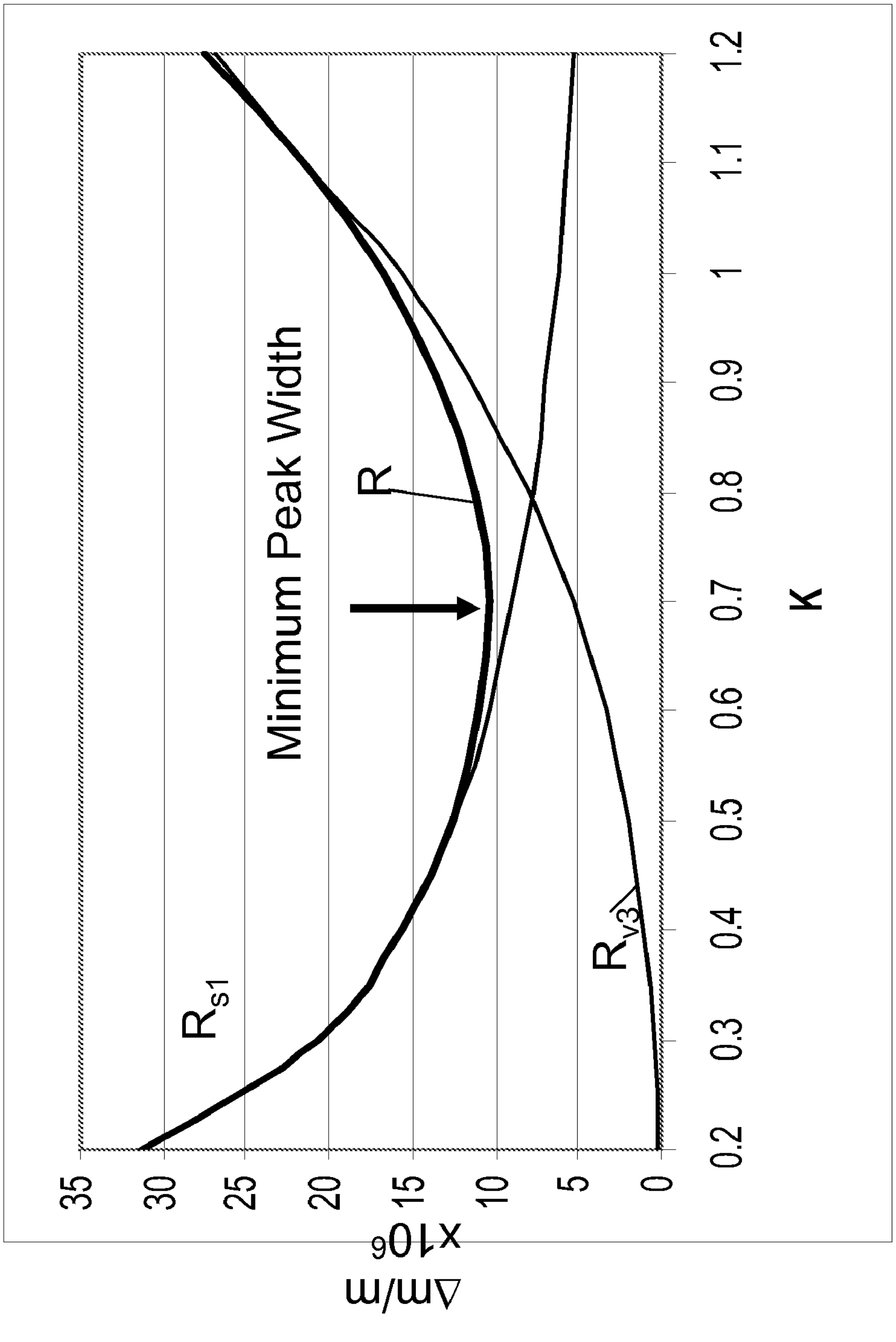
FIG. 5 is a plot illustrating the contributions to peak width due to uncertainty in initial position and uncertainty of initial velocity when determining the optimum value of the parameter $K=2d_1/(D_v-D_s)$. Shown are calculated contributions to peak width for $D_e$=3200 mm, m*=3 kDa, V=10 kV as function of $K=2d_1/(D_v-D_s)$.

The contributions to peak width due to $R_{s1}$ and $R_{v3}$ are shown as a function of K in FIG. 5 for analyzer of effective length 3200 mm for a focus mass m* of 3 kDa and accelerating voltage of 10 kV. The minimum peak width in the resultant peak width occurs at K=0.69 as shown in the figure in agreement with calculations using equation (29).

Figure 6:
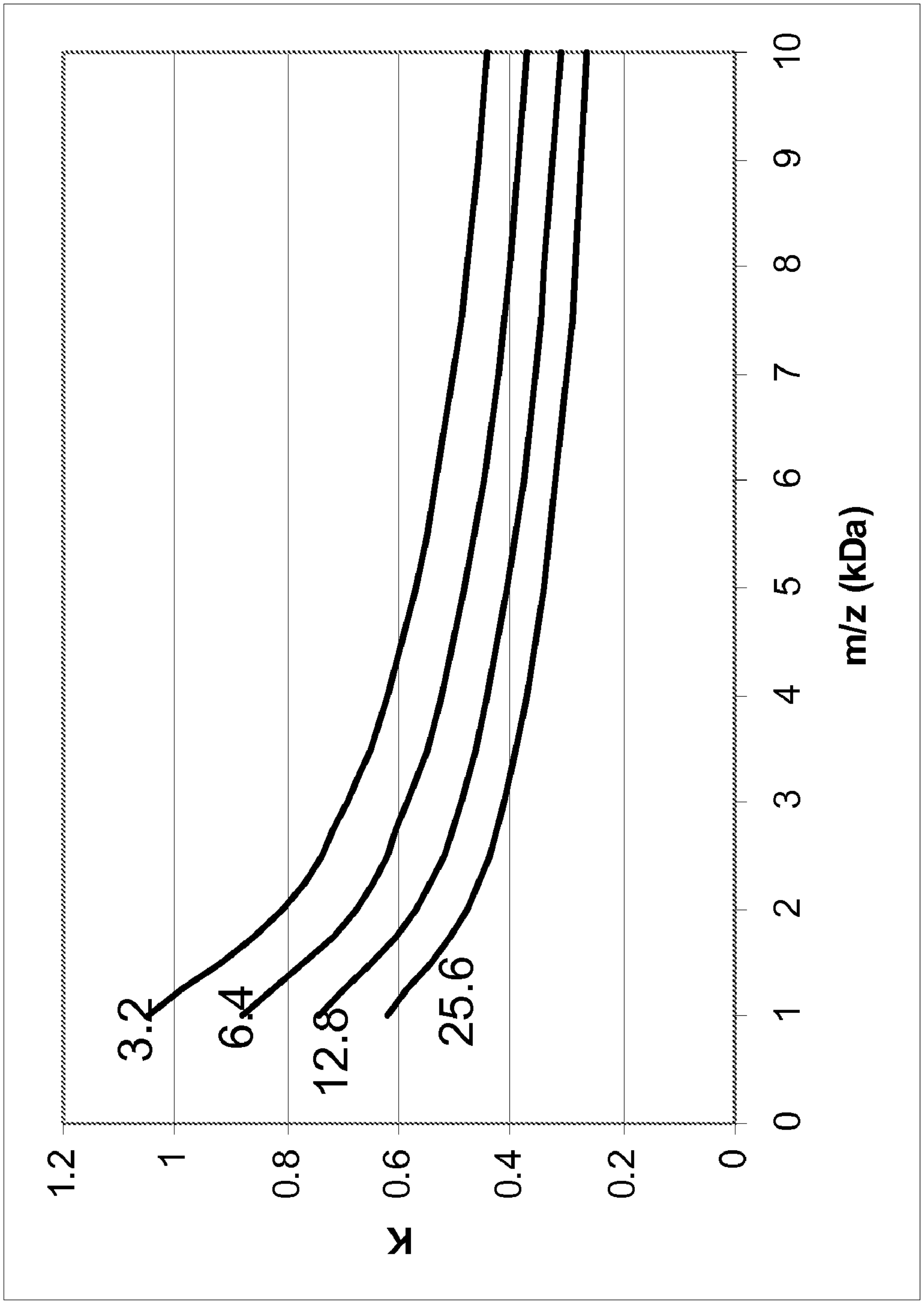
FIG. 6 is a plot of the optimum value of the parameter K as a function of the focus mass for different values of the effective length. Shown is the optimum value of $K=2d_1/(D_v-D_s)$ as function of focus mass. The effective length of the analyzer is in meters.

FIG. 6 illustrates the dependence of the optimum value of K on effective length of the analyzer $D_e$ and focus mass m* as predicted by equation (32). The other major contributor to peak width is due to uncertainty in the time measurement due to the finite width of single ion pulses and the width of the bins in the digitizer. Commercial detectors are now available that provide single ion peak widths less than 0.5 nsec and digitizers with 0.25 nsec bins are available. These allow the uncertainty, $\delta t$, in the time measurement to be reduced to about 0.75 nsec. With this value of $\delta t$ the limit on peak width is $$R_t=\Delta m/m=2(\delta t)C_1V^{1/2}/(D_e m^{1/2})=2(0.75)(0.0139)(10^{1/2})/(D_e[3]^{1/2})=3.81\times10^{-2}/D_e \quad (33)$$

Using the optimum value of K, and inserting $R_t$, $R_{s1}$, and $R_{v3}$ for each $D_e$ into equation (25) the maximum resolving power for 3 kDa at V=10 KV can be calculated as a function of the effective length $D_e$ of the analyzer.

Figure 7:
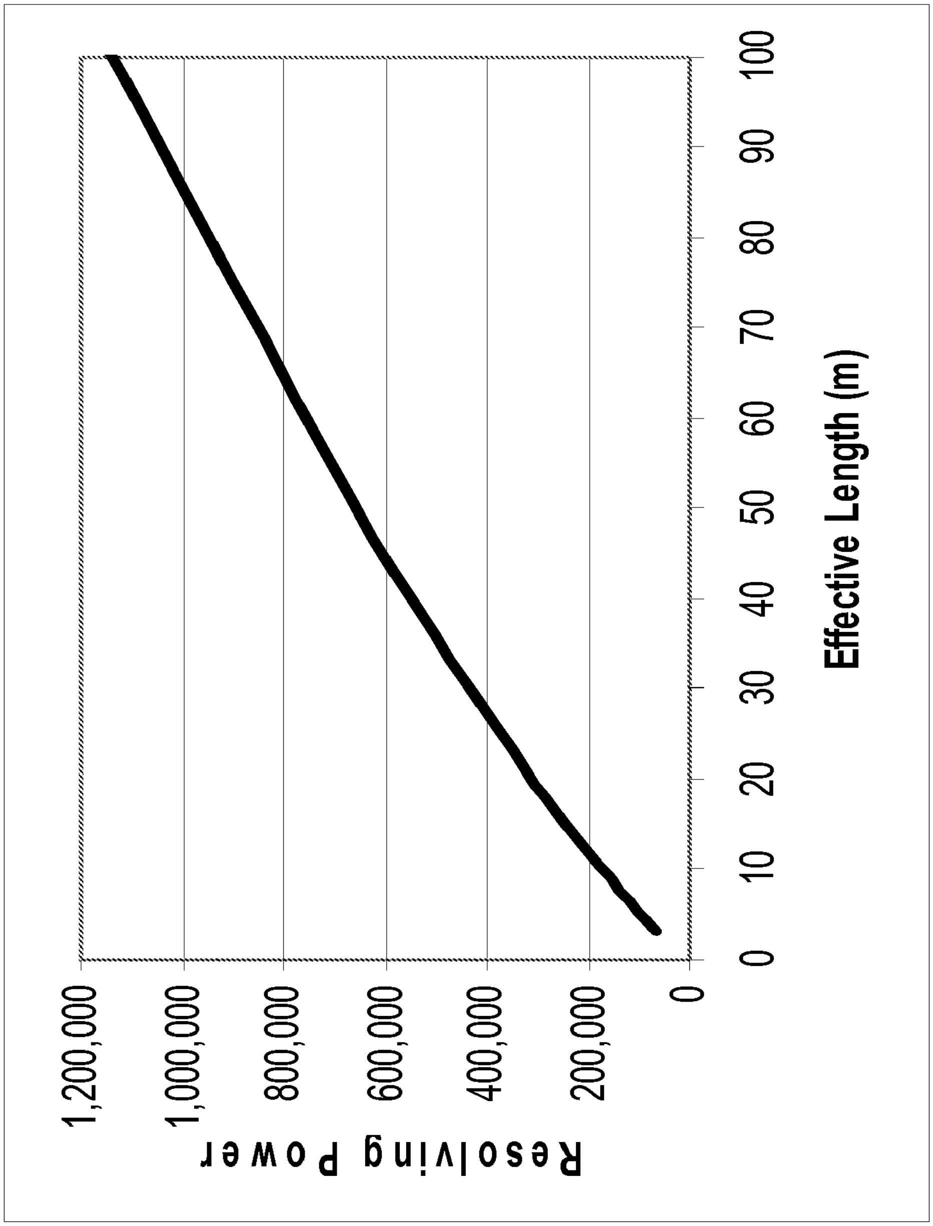
FIG. 7 is a plot of maximum resolving power at a focus mass of 3 kDa and accelerating voltage of 10 kV as a function of the effective length of the analyzer at optimum value of $K=2d_1/(D_v-D_s)$.

Results over a broad range are illustrated in FIG. 7. Increasing the length by a factor of 2 provides improvement in resolving power by about a factor of 1.8. Other possible contributions such as $R_L$ should also be proportional to $D_e{}^{-1}$. $R_V$ is independent of length and very low noise high voltage supplies are required to achieve the very high resolving power theoretically possible using a longer analyzer. The overall length of the analyzer is approximately equal to $0.4D_e$, thus achieving a resolving power of 1,000,000 requires an analyzer about 40 m in length. The cost of increasing the length is minimal since only a longer flight tube and mirror are required; all other elements are unchanged. The practical limitation is the size of the laboratory.

Figure 8:
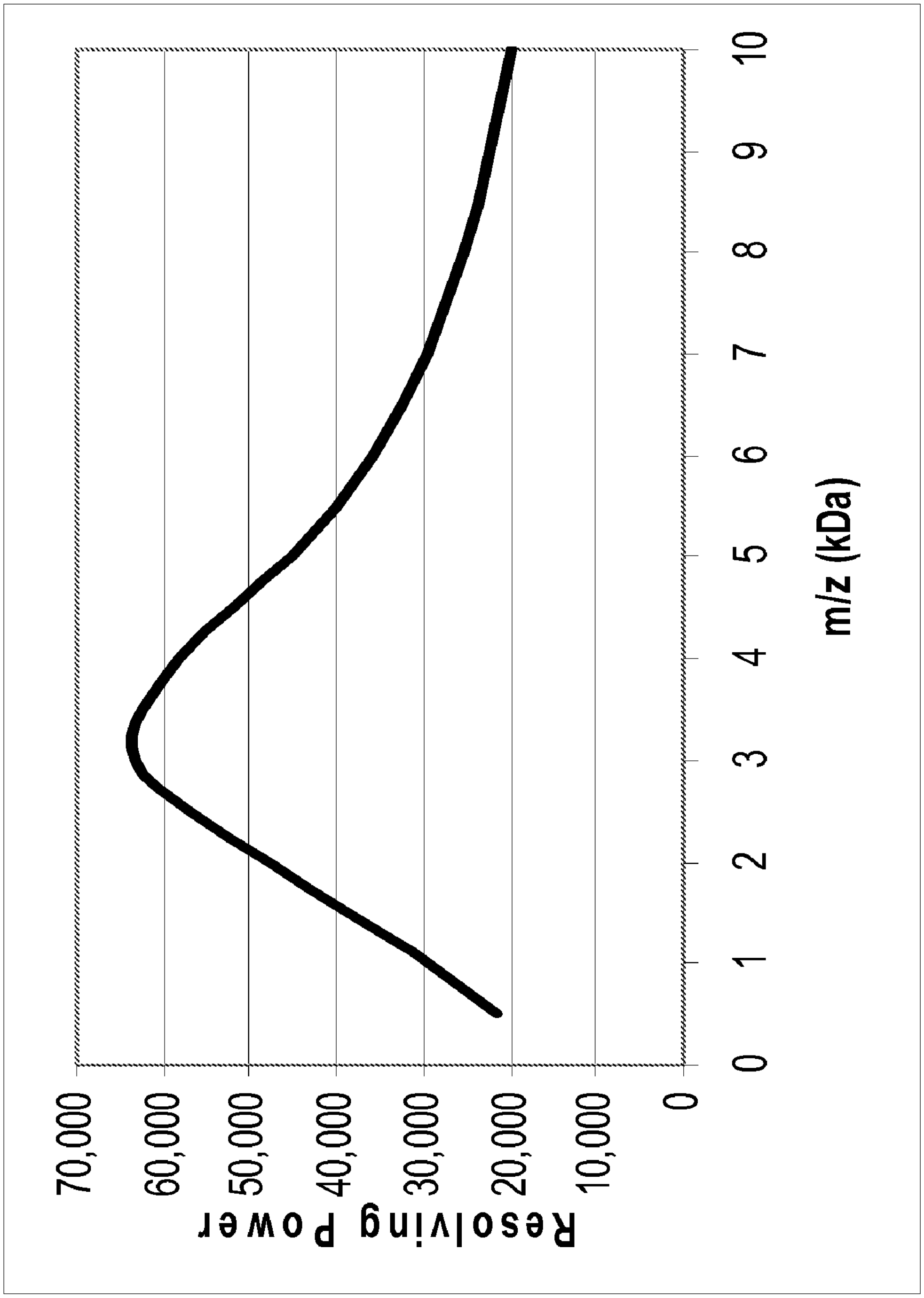
FIG. 8 is a plot summarizing the calculated resolving power as a function of mass-to-charge according to the invention in the range from 0.5 to 10 kDa with a focus mass of 3 kDa accelerating voltage of 10 kV, and effective analyzer length ($D_e$) of 3.2 m at the optimum value of the parameter $K=2d_1/(D_v-D_s)$.
Figure 9:
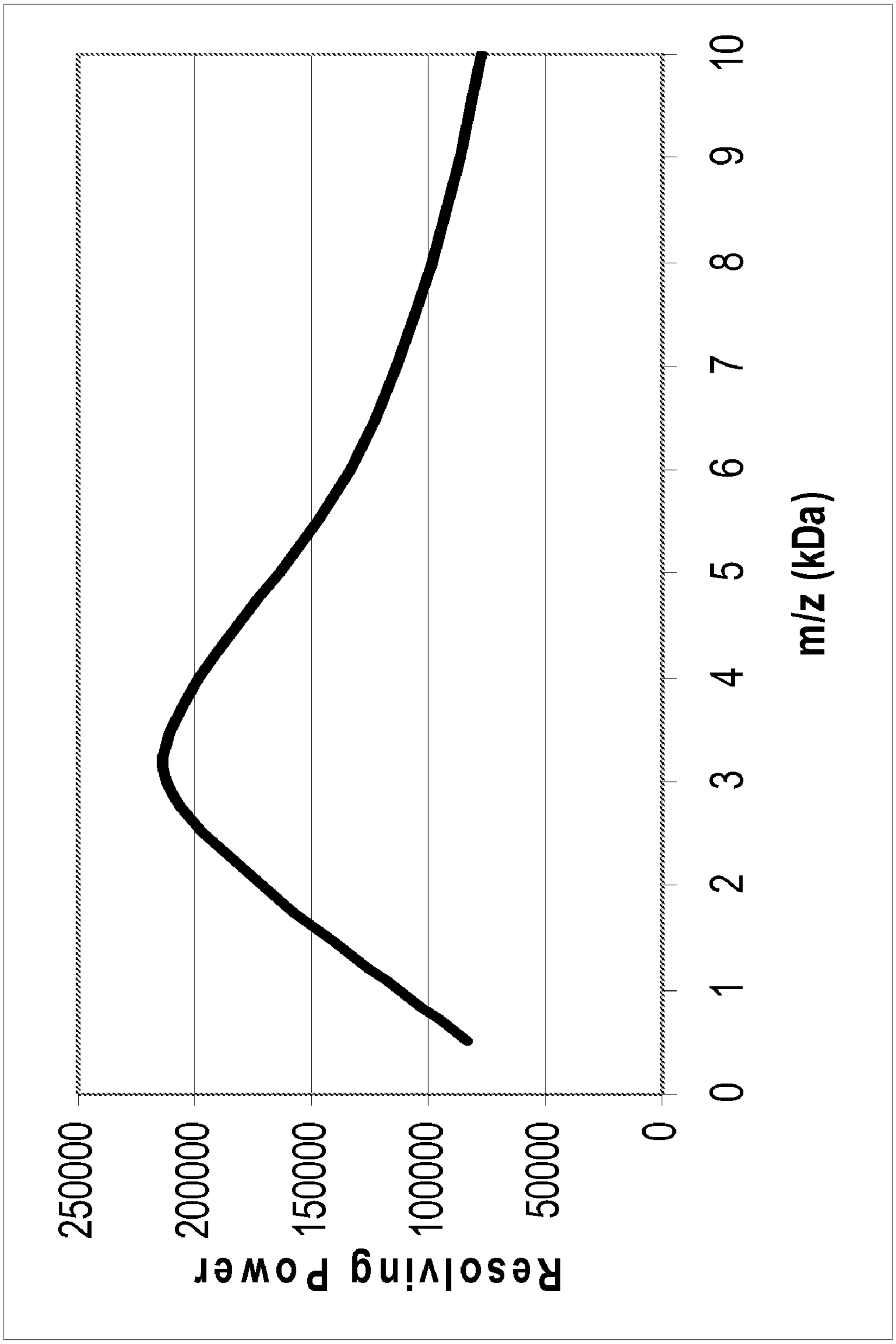
FIG. 9 is a plot summarizing calculated resolving power as a function of mass-to-charge according to the invention in the range from 0.5 to 10 kDa with a focus mass of 3 kDa accelerating voltage (V) of 10 kV, and effective analyzer length ($D_e$) of 12.8 m at the optimum value of the parameter $K=2d_1/(D_v-D_s)$ or 0.49.

Calculated resolving power as a function of m/z is summarized in FIG. 8 for m*=3 kDa, V=10 kV, K=0.693 and $D_e$=3.2 meters and FIG. 9 illustrates a similar calculation for K=0.49 and $D_e$=12.8 meters. Simultaneous first and second order focusing with the single-field ion source occurs for K=0.5. For other values of K, the first order focus is slightly longer or shorter than the second order focus. For example, with K=0.693, the focal lengths are $$D_{v1}=2d_1+2.89d_1=4.89d_1 \text{ and } D_{v2}=6d_1 \quad (34)$$

It is important to adjust the ion mirror potentials to achieve overall first order focusing, and the mirror can be adjusted to independently correct the second order focus. However, a small discrepancy in the second order focus is negligible so long as the error $\delta D/D_e$ is small compared to $\delta v_0/v_n$*. The first and second order focal lengths of the two-stage mirror are given by $$D_{m1}=4d_4w^{3/2}+4d_3[w/(w-1)][1-w^{1/2}] \quad (35)$$

$$3D_{m2}=4d_4w^{5/2}+4d_3[w/(w-1)][1-w^{3/2}] \quad (36)$$

Equations (1) and (2) are derived by setting these focal distances equal, but these can be varied independently, for example by adjusting $d_4$ by changing $V_2$ according to equation (3).

Figure 10:
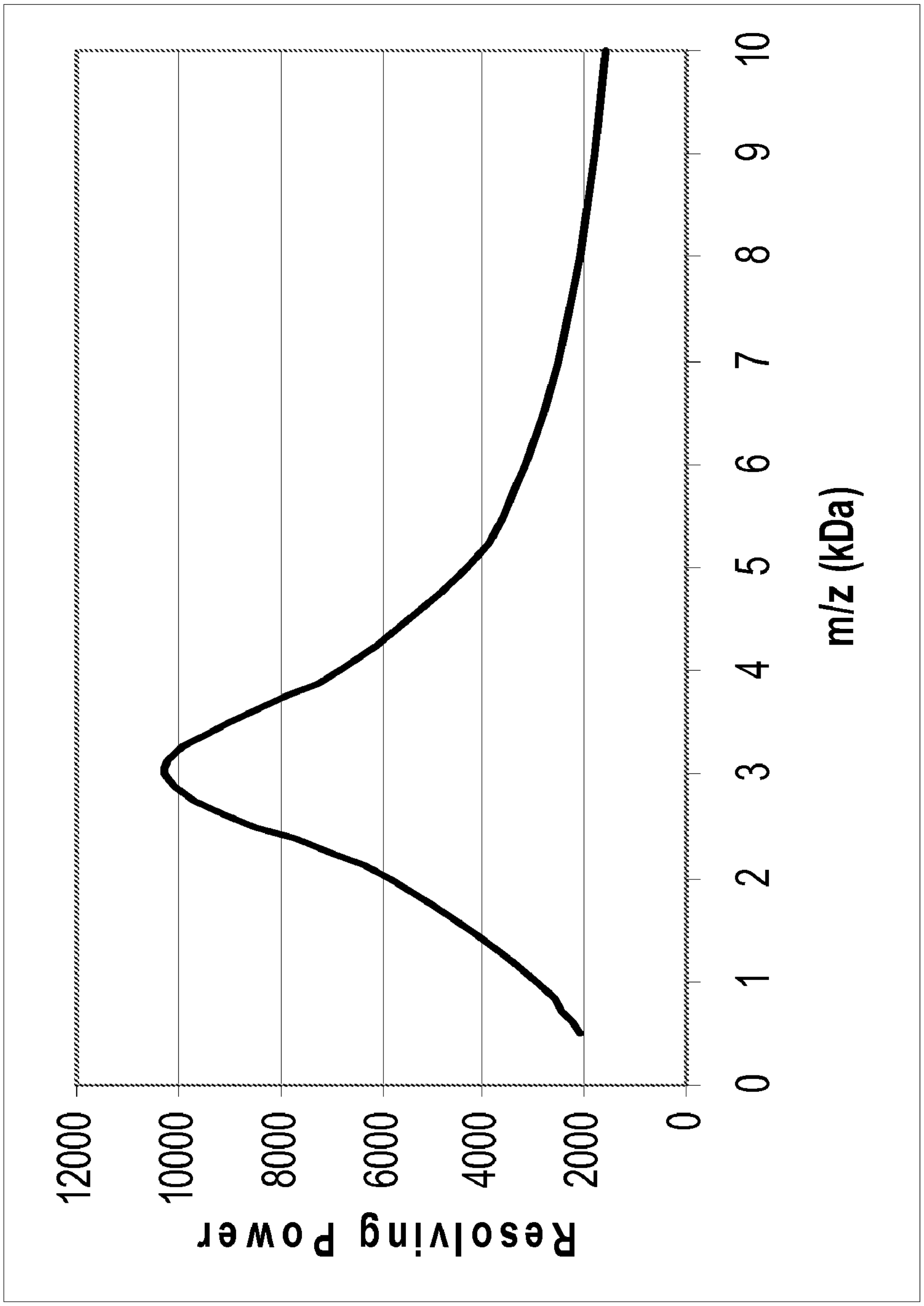
FIG. 10 is a plot summarizing calculated resolving power as a function of mass-to-charge according to the invention in the range from 0.5 to 10 kDa with a focus mass of 3 kDa accelerating voltage (V) of 4 kV, and effective analyzer length ($D_e$) of 0.4 m at the optimum value of the parameter $K=2d_1/(D_v-D_s)$ or K=0.826.

Some applications of MALDI-TOF require a small analyzer, for example, for a field portable instrument. The methods of this invention can also be applied to the optimum design of smaller analyzers. For example one may choose $D_e$=400 mm, and V=4 kV. For focus at m*=3 kDa the optimum value of K in this case is 0.826 according to equation (32). The calculated resolving power as a function of m/z is illustrated in FIG. 10. This provides adequate performance in the mass range suitable for peptides in small molecules with an analyzer less than 300 mm in length. The performance is superior to that available in many prior art instruments an order of magnitude or more larger.

An optimized reflecting analyzer comprises a single-stage source with the accelerating distance as short as practical without causing electrical discharges. In one embodiment, the accelerating distance is 3 mm and the accelerating voltage is 10 kV. The analyzer further comprises a two-stage ion mirror with the source and mirror adjusted to provide simultaneous first and second order focusing with the source focus at the optimum value. The optimum value of the source focus is determined as a function of focus mass, accelerating voltage, effective length, and initial velocity and spatial distributions using methods described herein. The ultimate resolving power is limited only by the overall length of the analyzer as restricted by the dimensions of the laboratory, but is otherwise unrestricted.

The other major contributor to peak width is due to uncertainty in the time measurement due to the finite width of single ion pulses and the width of the bins in the digitizer. With standard 5 um dual channel plate detectors and digitizers with 0.5 nsec bins the uncertainty δt is about 1.5 nsec. Commercial detectors are now available that provide single ion peak widths less than 0.5 nsec and digitizers with 0.25 nsec bins are available. These may allow the uncertainty, δt, in the time measurement to be reduced to about 0.75 nsec. The limit on peak width is $$R_t=\Delta m/m=2\delta t v_n/D_e=2(\delta t/D_e)C_1(V/m)^{1/2} \quad (37)$$

The optimum value of V/m for given initial conditions and geometry can be determined by finding the minimum for $R^2$ due to contributions from $R_t$ and $R_{v3}$. Thus $$R^2=[2\delta t v_n/D_e]^2+16K^6(\delta v_0/v_n)^6 \quad (38)$$

The minimum value of $R^2$ corresponds to $d(R^2)/dv_n=0$ $$v_n=12^{1/8}(K\delta v_0)^{3/4}(D_e/\delta t)^{1/4}=C_1(V/m)^{1/2} \quad (39)$$

The optimum value of K determined by optimizing between $R_{s1}$ and $R_{v3}$ is given by equation (32).

The overall optimum can be found by simultaneously satisfying both (32) and (37). This is satisfied for $$v_n=\delta x/K\delta t \quad (40)$$

This condition corresponds to $R_{s1}=R_t$. The resulting peak width R is then given by $$R=[2R_{s1}^2+R_{v3}^2]^{1/2} \quad (41)$$

The global optimum conditions can be determined by substituting $v_n$ as determined from equation (40) and determining the optimum value of K from the resulting equation. Thus from equation (30)

$$R^2=8K^{-2}[\delta x/D_e]^2+16K^6(\delta v_0/v_n)^6=8K^{-2}[\delta x/D_e]^2+16K^6(\delta v_0)^6(K\delta t/\delta x)^6 \quad (42)$$

And the minimum value found for $d(R^2)/dK=0$ is $$K=(12)^{-1/14}(\delta x/\delta t\delta v_0)^{3/7}(\delta x/D_e)^{1/7} \quad (43)$$

The optimum value of V/m is given by $$V/m=(\delta x/KC_1\delta t)^2 \quad (44)$$

Equations (43) and (44) give the focusing parameter K and voltage V corresponding to maximum resolving power for a given mass m with an analyzer of effective length $D_e$, for time measurement uncertainty δt, initial velocity spread $\delta v_0$, and initial position uncertainty δx.

The equations presented here provide the theoretical background for methods to design and optimize reflecting analyzers for generating spectra with high resolution and mass accuracy. The emphasis is on application to MALDI, but the techniques described can be applied to any TOF mass spectrometer. If the initial conditions including the initial velocity spread $\delta v_0$, and initial position uncertainty δx are known or can be accurately estimated, and if the measurement uncertainty δt and the jitter in the delay δj are known, then for any size analyzer the optimum time lag Δt, the optimum mirror voltages, and optimum acceleration voltage can be determined accurately for any specified focus mass. Furthermore, the maximum resolving power possible can be accurately determined. Alternatively for any specified resolving power required the minimum analyzer size and optimum acceleration voltage can be determined.

Calibration for Accurate Mass Determination

With first and second order focusing the flight time is proportional to the square root of the mass except for the time spent in the ion source that depends on the initial velocity. Thus the total flight time for one embodiment is given by $$t-t_0=(D_e/v_n)[1-2d_1yv_0/(D_ev_n)]=Am^{1/2}[1-Bm^{1/2}]=X \quad (45)$$

where $t_0$ is the offset between the extraction pulse and the start time of the digitizer, and the default values of the constants are $$A=D_e/CV^{1/2} B=(2d_1y/D_e)(v_0/CV^{1/2}) \quad (46)$$

This equation can be inverted using the quadratic formula to give an explicit expression for mass as a function of flight time.

$$m^{1/2}=(2B)^{-1}[1-(1-4BX/A)^{1/2}] \quad (47)$$

Higher order terms may become important if a very wide mass range is employed. A higher order correction can be determined by the following procedure.

$$Z(m)=[(t-t_0)/\{Am^{1/2}(1-Bm^{1/2})\}]=1-C(m-m_0) \quad (48)$$

If a significant systematic variation of Z with m is observed, then the results are fitted to an explicit function, such as given in equation (48). This factor Z(m) is then applied to the value of $m^{1/2}$ from equation (47) to determine the accurate mass. The value determined from equation (47) is divided by Z(m).

The values of $t_0$, A, and B are determined by least squares fit from three or more peaks to equation (1). If a systematic variation of Z is observed, then the higher order term may be important, and the offset $m_0$ may be necessary to compensate for the systematic error in the calibration.

While this invention has been particularly shown and described with references to preferred embodiments thereof, it will be understood by those skilled in the art that various changes in form and details may be made therein without departing from the scope of the invention encompassed by the appended claims.

What is claimed is:

1. A reflecting time-of-flight mass spectrometer comprising:

a. an ion source vacuum housing configured to receive a MALDI sample plate;

b. a pulsed ion source located within the ion source housing;

c. an analyzer vacuum housing;

d. a gate valve located between and operably connecting said ion source vacuum housing and said analyzer vacuum housing and maintained at or near ground potential;

e. a field-free drift space at ground potential located within said analyzer vacuum housing;

f. an ion mirror located at the end of the field-free space in said analyzer vacuum housing opposite said gate valve; and g. an ion detector located in the field-free space within the analyzer vacuum housing in close proximity to the gate valve and having an input surface to receive ions reflected by the ion mirror.

2. A reflecting time-of-flight mass spectrometer of claim 1 further comprising:

a. a pulsed laser beam directed to strike the MALDI sample plate and produce a pulse of ions;

b. a high voltage pulse generator operably connected to the pulsed ion source; and c. a time delay generator providing a predetermined time delay between the laser pulse and the high voltage pulse.

3. The reflecting time-of-flight mass spectrometer of claim 2 having a predetermined time delay comprising an uncertainty which is not more than 1 nanosecond.

4. The reflecting time-of-flight mass spectrometer of claim 2 further comprising one or more ion optical elements for spatially focusing an ion beam.

5. The reflecting time-of-flight mass spectrometer of claim 4 wherein said one or more ion optical elements comprise:

a. an extraction electrode at ground potential in close proximity to the MALDI sample plate; and b. a first ion lens located between the pulsed ion source and the gate valve.

6. The reflecting time-of-flight mass spectrometer of claim 5 wherein each of the ion lenses comprise either an einzel lens or a cathode lens.

7. The reflecting time-of-flight mass spectrometer of claim 5 wherein the amplitude of the high voltage pulse is 10 kilovolts relative to ground potential and the distance between the MALDI sample plate and a grounded extraction electrode is less than 3 mm.

8. The reflecting time-of-flight mass spectrometer of claim 1 wherein the ion mirror is a two-stage ion mirror.

9. The reflecting time-of-flight mass spectrometer of claim 8 wherein the two-stage ion mirror comprises two substantially uniform fields, wherein the field boundaries are defined by grids that are substantially parallel.

10. The reflecting time-of-flight mass spectrometer of claim 8 wherein the two-stage ion mirror comprises two substantially uniform fields, wherein the field boundaries are defined by substantially parallel conducting diaphragms having small apertures aligned with an incident and reflected ion beam.

11. The reflecting time-of-flight mass spectrometer of claim 8 wherein the electrical field strength in the first stage of the two-stage ion mirror adjacent to the field-free region is substantially greater than the electrical field strength in the second stage of the two-stage ion mirror.

12. The reflecting time-of-flight mass spectrometer of claim 8 wherein the electrical field strength in the first stage of the two-stage ion mirror adjacent to the field-free region is between two and four times greater than the electrical field strength in the second stage of the two-stage ion mirror.

13. The reflecting time-of-flight mass spectrometer of claim 6 further comprising one or more pairs of deflection electrodes located in the field-free region at ground with any pair energized to deflect ions in either of two orthogonal directions.

14. The reflecting time-of-flight mass spectrometer of claim 7 wherein at least one of the deflection electrodes of any pair of deflection electrodes is energized by a time-dependent voltage resulting in the deflection of ions in one or more selected mass ranges.

15. The reflecting time-of-flight mass spectrometer of claim 2 wherein the transverse distance from the pulsed laser beam to the center line of the ion detector is not more than 25 mm.

16. The reflecting time-of-flight mass spectrometer of claim 1 wherein the input surface of the ion detector is perpendicular to the axis of the ion mirror with a maximum error of 0.05 degrees.

17. A method for designing a high-resolution MALDI-TOF mass spectrometer with predetermined limits on overall size and uncertainty in the time measurement comprising:

a. determining or estimating the uncertainties in the initial velocity and position of the ions produced in the ion source;

b. calculating values for the critical distance parameters defining the analyzer geometry;

c. calculating the optimum time lag between laser pulse and high-voltage extraction pulse as a function of focus mass;

d. calculating the optimum accelerating voltages and mirror voltages as functions of focus mass; and e. calculating the theoretical resolving power as a function of m/z.

18. A method for designing a high-resolution MALDI-TOF mass spectrometer to achieve a specified resolving power at a specified mass with specified values of the uncertainties in the initial velocity and position of ions produced in the ion source and the uncertainty in the time measurement comprising:

a. calculating the minimum overall length and values for the critical distance parameters defining the analyzer geometry;

b. calculating the optimum accelerating voltages and mirror voltages; and c. calculating the optimum time lag between laser pulse and high-voltage extraction pulse.

19. The reflecting time-of-flight mass spectrometer of claim 1 wherein the pulsed laser beam operates at a frequency of 5 khz.

* * * * *